Aug. 14, 1973          C. K. BAREFOOT          3,752,726
APPARATUS FOR RETREADING TIRES
Filed April 16, 1971
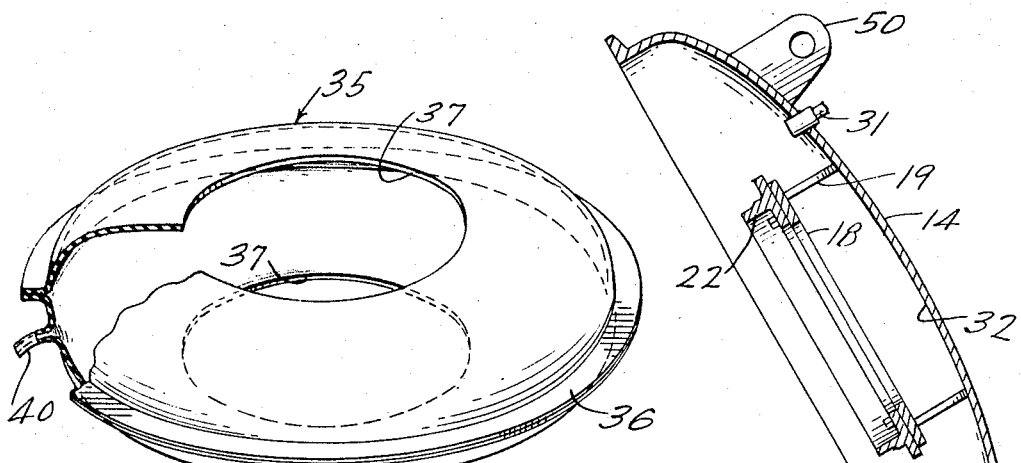
FIG-2-
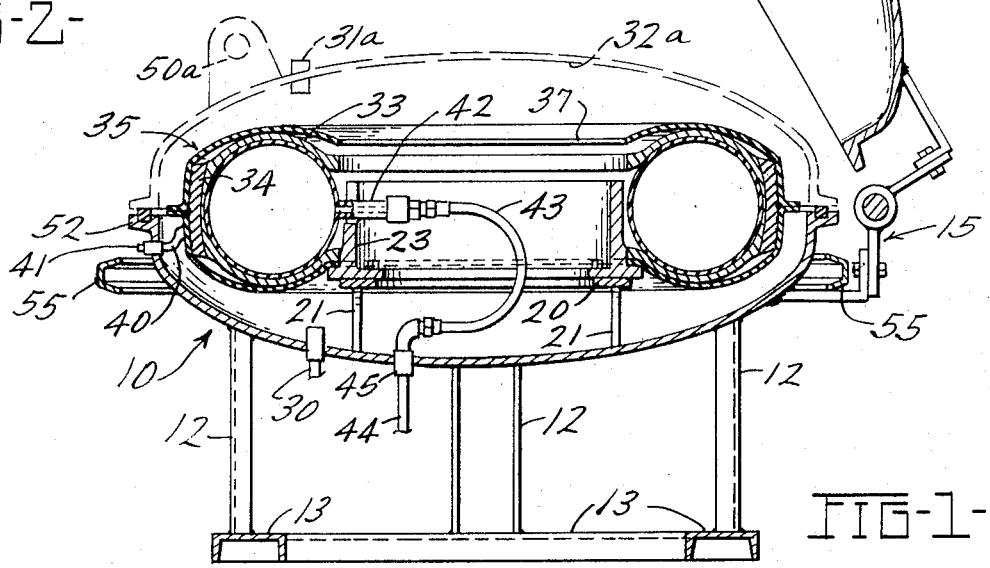
FIG-1-
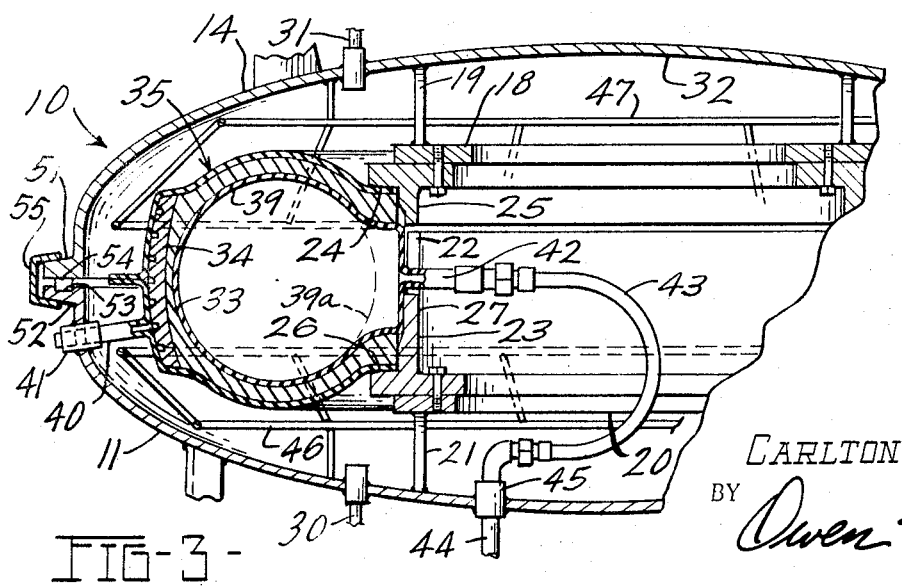
FIG-3-
INVENTOR:
CARLTON K. BAREFOOT.
BY
Owen & Owen
ATT'YS.

United States Patent Office 3,752,726
Patented Aug. 14, 1973

3,752,726
APPARATUS FOR RETREADING TIRES
Carlton Keith Barefoot, 601 Shellbark Road,
Muncie, Ind. 47304
Filed Apr. 16, 1971, Ser. No. 134,674
Int. Cl. B29h 5/04, 17/36
U.S. Cl. 156—394      8 Claims

ABSTRACT OF THE DISCLOSURE

The present invention is an apparatus for bonding a preshaped layer of retread stock to the periphery of a tire casing. A pair of mating shell members define a tire cavity and receive a tire assembly comprising the tire casing with attached tread stock. The tire assembly is positioned within an elastomeric envelope. A flexible air tube is positioned within the tire assembly in opposed relationship to the envelope. When the mating shell members are in a closed position, air seals are effected between the inner edges of the envelope and the tire beads. The air tube is pressurized to a predetermined pressure. The tire cavity is pressurized to a pressure below the predetermined pressure. The tire casing and its attached tread stock are held together tightly by the pressure forces. Heat is applied for bonding the retread stock to the tire casing.

BACKGROUND OF THE INVENTION

This invention relates to apparatus for retreading tires. More particularly, the invention relates to apparatus for bonding a preshaped layer of retread stock to the periphery of a tire casing.

The prior art has attempted to retread tires by numerous methods and apparatus. One prior art method is the placing of a tire assembly, including a tire casing, binding layer and tread strip within a flexible resilient cover. The entire assembly is mounted on a rim and placed in an autoclave. An example of such prior art is shown in Carver Patent No. 3,236,709.

One major difficulty or problem found in the prior art is the manual handling of prior art apparatus. Many of the tires being retreaded are large size truck tires or tractor tires. To manually prepare the prior art tire assemblies is a laborious and time consuming task. Furthermore, many of the prior art methods are very slow.

SUMMARY OF THE INVENTION

The present invention comprises apparatus including a pair of mating shell members which are moveable between an open position and a closed position. The shell members define a tire cavity when in their closed position. Support means are provided within the shell members for supporting a tire within the tire cavity. An elastomeric ring-shaped envelope having a tread portion and opposed sidewall portions, and being adapted to receive a tire, is positioned on the supporting means. A flexible air tube is positioned within the tire in opposed relationship with the envelope. Means are provided for pressurizing the air tube to a predetermined pressure and for pressurizing the exterior of the tire to another pressure normally below said predetermined pressure. Heating means are also provided within the mating shells.

The primary object of the present invention is to provide improved apparatus for the application of preformed tread stock to a tire casing.

BRIEF DESCRIPTION OF THE DRAWING

FIG. 1 is a vertical cross-sectional view of retreading apparatus according to the invention, with a closed position of the apparatus shown in dashed lines;

FIG. 2 is a diagrammatic view, with a portion broken away, of the elastomeric envelope shown in FIG. 1; and FIG. 3 is an enlarged sectional view, similar to FIG. 1, with portions broken away, and showing another embodiment of heating means.

DESCRIPTION OF THE PREFERRED EMBODIMENTS

Apparatus for bonding a preshaped layer of retread stock to the periphery of a tire casing, according to the present invention, is generally indicated in FIG. 1 by the reference number 10. The retreading apparatus 10 includes a lower, generally hemispherical shell 11 which is supported by legs 12. Reinforcing structural members 13 interconnect the legs 12 and provide a base for the retreading apparatus 10.

An upper generally hemispherical shell 14 is moveably mounted with respect to the lower mating shell 11 by a hinge assembly 15. The two mating shells 11 and 14 are shown by solid lines in FIG. 1 in their open position. The closed position of the shells 11 and 14 is shown in solid lines in FIG. 3 and the closed position of the upper shell 14 is indicated by dashed lines at 14a in FIG. 1.

Referring to FIGS. 3 and 1, an upper supporting plate 18 is connected to the upper shell 14 by depending posts 19. Similarly, a supporting plate 20 is mounted in the lower shell 11 by a plurality of posts 21. A generally ring-shaped bead plate 22 is bolted on the upper supporting plate 18 and a lower, generally ring-shaped bead plate 23 is bolted to the lower supporting plate 20. The bead plate 22 includes a circular lip 24 and a depending circular wall member 25. Similarly, the lower bead plate 23 includes a circular lip 26 and an upstanding circular wall member 27. When the shells 11 and 14 are in the closed position (see FIG. 3), the wall members 25 and 27 cooperate to form a generally vertical backwall, as explained below.

Heating means, for example steam fittings 30 and 31, are mounted in the lower shell 11 and upper shell 14, respectively. Steam introduced through the fittings 30 and 31 raise the temperature within a tire cavity 32 (see FIG. 3) defined by the shells 11 and 14 to a temperature between 200° F. and 300° F. during the bonding period. Preferably, the temperature is raised by the steam to approximately 260° F. Another embodiment of heating means is shown in FIG. 3. In this embodiment, electrical resistance heaters 46 and 47 are mounted in the shells 11 and 14, respectively.

The fittings 30 and 31 are valved and may be interchangeably used to pressurize the tire cavity 32 or to add steam for heating purposes to the tire cavity 32.

A tire casing 33 having a layer of preformed tread stock 34 attached to the tread section is inserted in an elastomeric ring-shaped envelope 35 (see FIG. 2). The envelope 35 is preferably constructed of rubber, a high temperature plastic, or similar flexible material. In the present embodiment, the envelope 35 is constructed of two flat pieces of rubber joined together by a peripheral weld 36. The envelope 35 has a hole therethrough defined by inner edges 37. The envelope 35 has a tread portion and opposed sidewall portions.

A flexible air tube 39 is positioned within the tire casing 33, as shown in FIG. 3. The flexible air tube 39 is in an opposed relationship with the envelope 35.

Referring to FIGS. 1 and 3, the tire casing 33 is positioned upon the lip 26 of the lower bead plate 23. The lower, inner edge 37 of the envelope 35 is positioned between the tire bead and the lip 26. When the upper shell 14 is moved to the closed position, the lip 24 of the upper bead plate 22 is positioned adjacent the upper, inner edge 37 of the envelope 35. In the closed position, the lips 24 and 26 of the bead plates 22 and 23 together with the inner edges 37 of the envelope 35 and the tire beads form air seals.

The envelope 35 includes an air outlet 40 which is in communication with a fitting 41 in the lower shell 11 of the retreading apparatus 10. Air which is trapped between the envelope 35 and the tire is vented through the air outlet 40 to atmosphere.

The flexible air tube 39 includes an air inlet 42 coupled to an airline 43 which in turn is in communication with an air conduit 44. A fitting 45 is mounted by the lower shell 11 of the retreading apparatus 10.

The air conduit 44, airline 43 and air inlet 42 are utilized to pressurize the flexible air tube 39. As the air tube 39 expands from its dashed line position 39a (see FIG. 3) to its solid line position, it exerts force against the interior of the tire casing 33. In the closed position, the upper wall member 25 of the upper bead plate 22 cooperates with the lower wall member 27 of the lower bead plate 23 to serve as a backwall for the flexible air tube 39.

A bracket 50 is mounted on the upper shell 14 opposite the hinge assembly 15. The bracket 50 is utilized in opening and closing the upper shell 14.

Locking ring means are provided for sealing the mating shell members 11 and 14 when the apparatus 10 is in the closed position. In the present embodiment, the locking ring means includes a peripheral flange 51 on the upper shell 14 and a cooperating peripheral flange 52 on the lower shell 11. The peripheral flange 52 includes a circular groove 53 which receives a sealing gasket 54. After the retreading apparatus 10 is in the closed position (see FIG. 3), a generally U-shaped locking ring 55 is positioned over the cooperating peripheral flanges 51 and 52 to provide a pressure seal for the retreading apparatus 10.

The retreading apparatus 10 is particularly adaptable to large size tires, such as are used on trucks, tractors and aircraft. In a typical retreading operation using the apparatus 10, bead plates 22 and 23 of a correct size are mounted on the supporting plates 18 and 20, respectively. The preformed layer of tread stock 34 is attached to the tire casing 33 and the resulting tire assembly is positioned within the envelope 35. The flexible air tube 39 is placed within the tire casing 33 and the assembly is next positioned on the lip 26 of the lower bead plate 23. The air outlet 40 of the envelope 35 is connected to the air fitting 41 and the airline 43 is coupled to the air inlet 42 of the flexible air tube 39.

The upper mating shell 14 is lowered to the closed position (see FIG. 3) and the locking ring 55 is positioned around the now mating peripheral flanges 51 and 52 to effect the required seal.

Fluid pressure of approximately 130 p.s.i. is introduced into the air tube 39. The degree of pressurization will depend largely on the type and size of the tire being retreaded and will vary from 100 to 150 p.s.i. The tire cavity 32 is pressurized by introducing air or steam through either or both of the valved fittings 30 and 31. The tire cavity 32 is pressurized to approximately 90 p.s.i. The pressure within the tire cavity 32 acting upon the exterior of the tire is normally below the pressure within the air tube 39. However, it has been found that in some instances the tube pressures may be approximately equal.

The resultant pressure forces acting upon the preformed layer of tread stock 34 and tire casing 33 force these elements into a close bonding condition. The tread stock 34 is forcibly pressed against the exterior of the tire casing 33 which, conversely, is pressed outwardly under force. This relatively high cumulative pressure force is maintained for a sufficient time period to insure bonding of the tread stock 34 to the tire casing 33. Any air which has been trapped between the envelope 35 and the tread stock 34 or casing 33 escapes to atmosphere through the air outlet 40.

Steam is introduced through the fittings 30 and 31 and the temperature within the tire cavity 32 is raised to between 200° F. and 300° F., for example 260° F., during the bonding period. After the bonding period is completed, the locking ring 55 is released and the upper shell 14 moved to the open position shown in FIG. 2. By utilizing the retreading apparatus 10, according to the present invention, the bonding period is minimized. It has been found that with an average sized tire, a complete operation may be completed in approximately sixty minutes.

What I claim is:

1. Apparatus for bonding a preshaped layer of retread stock to the periphery of a tire comprising, in combination, a pair of upper and lower mating shell members moveable between an open position and a closed position, said shell members defining a tire cavity when in the closed position, support means for supporting a tire within such tire cavity, said support means including an upper bead plate mounted in said upper shell member and a lower bead plate mounted in said lower shell member, an elastomeric ring-shaped envelope for receiving the tire, said envelope including an air discharge outlet, a flexible air tube adapted to be positioned within the tire in opposed relationship to said envelope, sealing means on said bead plates cooperating with said envelope and the bead of such tire for effecting a fluid seal between the inner edges of said envelope and the tire when said shell members are in the closed position, means for pressurizing said air tube to a predetermined pressure, means for pressurizing the exterior of the tire to an exterior pressure below said predetermined pressure, and heating means for heating the interior of the mating shells when in the closed position.

2. Apparatus for bonding a preshaped layer of retread stock to the periphery of a tire, according to claim 1, wherein said lower bead plate includes a first circular lip and a first wall member extending upwardly adjacent said first lip.

3. Apparatus for bonding a preshaped layer of retread stock to the periphery of a tire, according to claim 2, wherein said upper bead plate includes a second circular lip and a second wall member extending downwardly adjacent said second circular lip, wherein said first and second tire bead lips comprise said sealing means for effecting a fluid seal between the inner edges of said envelope and the tire when said shell members are in the closed position.

4. Apparatus for bonding a preshaped layer of retread stock to the periphery of a tire, according to claim 3, wherein when said shell members are in the closed position, said first and second wall members cooperate to form a generally vertical backwall to limit rearward expansion of said flexible air tube.

5. Apparatus for bonding a preshaped layer of retread stock to the periphery of a tire, according to claim 1, including hinge means for connecting said mating shell members and locking ring means for sealing said mating shell members when in the closed position.

6. Apparatus for bonding a preshaped layer of retread stock to the periphery of a tire, according to claim 1, wherein said heating means includes at least one steam fitting in fluid communication with such tire cavity.

7. Apparatus for bonding a preshaped layer of retread stock to the periphery of a tire, according to claim 1, wherein said heating means includes at least one electrical resistant heater positioned within at least one of said shell members.

8. Apparatus for bonding a preshaped layer of retread stock to the periphery of a tire, according to claim 1, including base means for supporting said lower shell member above the floor elevation.

(References on following page)

References Cited

UNITED STATES PATENTS

| | | | |
|---|---|---|---|
| 1,483,857 | 2/1924 | Fitzharris | 425—39 |
| 1,745,146 | 1/1930 | Brown | 425—47 |
| 2,198,493 | 4/1940 | Freeman | 425—47 |
| 3,241,190 | 3/1966 | Laudisa | 425—25 |
| 3,236,709 | 2/1966 | Carver | 156—96 |
| 1,870,805 | 8/1932 | Gammeter | 425—28 |
| 2,904,842 | 9/1959 | Alm | 264—315 |

FOREIGN PATENTS

| | | | |
|---|---|---|---|
| 546,758 | 7/1942 | Great Britain | 425—43 |
| 874,529 | 8/1961 | Great Britain | 425—40 |

ALFRED L. LEAVITT, Primary Examiner

C. B. COSBY, Assistant Examiner

U.S. Cl. X.R.

156—96, 129; 425—19, 32, 36, 39, 41, 43, 45, 47, 58